US006803925B2

(12) United States Patent
Vronay

(10) Patent No.: US 6,803,925 B2
(45) Date of Patent: Oct. 12, 2004

(54) ASSEMBLING VERBAL NARRATION FOR DIGITAL DISPLAY IMAGES

(75) Inventor: David P. Vronay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 09/948,202

(22) Filed: Sep. 6, 2001

(65) Prior Publication Data

US 2003/0048289 A1 Mar. 13, 2003

(51) Int. Cl.[7] .............................. G06F 3/00; G06F 3/14
(52) U.S. Cl. ....................... 345/730; 345/731; 345/726; 715/500.1; 715/512
(58) Field of Search ................................ 345/730, 731, 345/732, 716, 717, 726, 725, 723, 720, 764, 727, 978; 715/500.1, 512, 526, 520, 517, 530

(56) References Cited

U.S. PATENT DOCUMENTS

| 6,084,590 | A | | 7/2000 | Robotham et al. ........... 345/419 |
| 6,108,001 | A | * | 8/2000 | Tuttle ......................... 345/730 |
| 6,121,963 | A | * | 9/2000 | Ange ......................... 715/500.1 |
| 6,333,753 | B1 | | 12/2001 | Hinckley .................... 345/768 |
| 6,369,835 | B1 | * | 4/2002 | Lin ............................. 345/726 |
| 6,480,191 | B1 | * | 11/2002 | Balabanovic ............ 345/723 X |
| 6,624,826 | B1 | | 9/2003 | Balabanovic ................ 345/727 |
| 6,665,835 | B1 | * | 12/2003 | Gutfrund et al. ......... 715/500.1 |
| 2002/0109712 | A1 | * | 8/2002 | Yacovone et al. ........... 345/732 |
| 2003/0085913 | A1 | * | 5/2003 | Ahmad et al. .............. 345/730 |

OTHER PUBLICATIONS

Minos N. Garofalakis, et al., Resource Scheduling for Composite Multimedia Objects, Proceedings of the 24th VLDB Conference, 1998, 12 pages, New York, USA.

Gultekin Ozsoyoglu, et al., Automating the Assembly of Presentations from Multimedia Databases, Case Western Reserve University, 1996, 20 pages, Cleveland, USA.

* cited by examiner

Primary Examiner—Raymond J. Bayerl
(74) Attorney, Agent, or Firm—Amin & Turocy, LLP

(57) ABSTRACT

A computer-based narration assembly system and method provide an environment analogous to in-person sharing of photographs by utilizing spontaneous verbal narration or story-telling, together with manual indications by the story-teller of significant or relevant image portions. The system combines the verbal narration with automatic cinematic display manipulations that relate to the manual indications by the story-teller to form a multimedia production or "movie" from the display images. The cinematic display manipulations may include pans, zooms, fades, etc. that animate the display of the images and transitions between them.

30 Claims, 4 Drawing Sheets

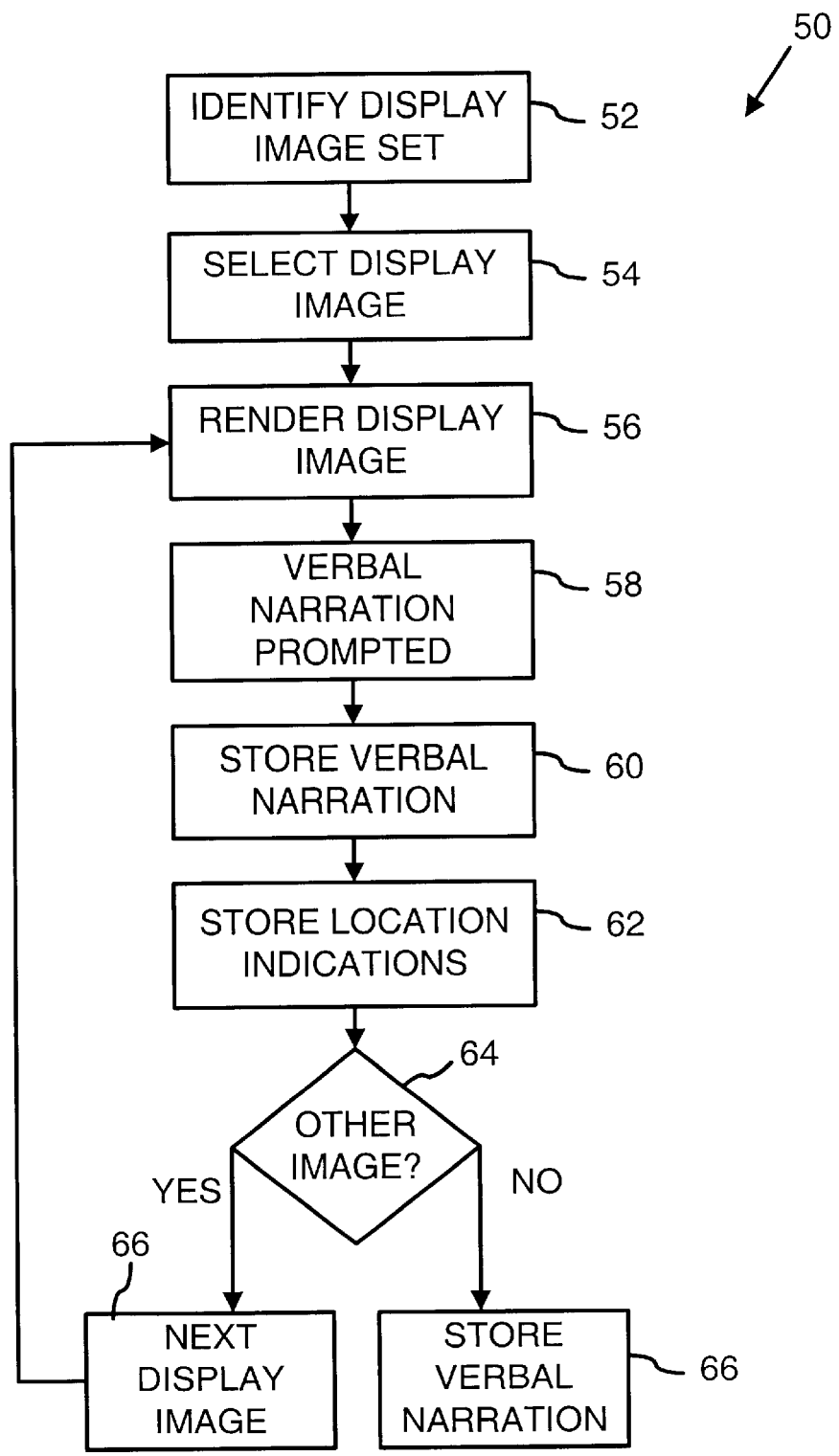

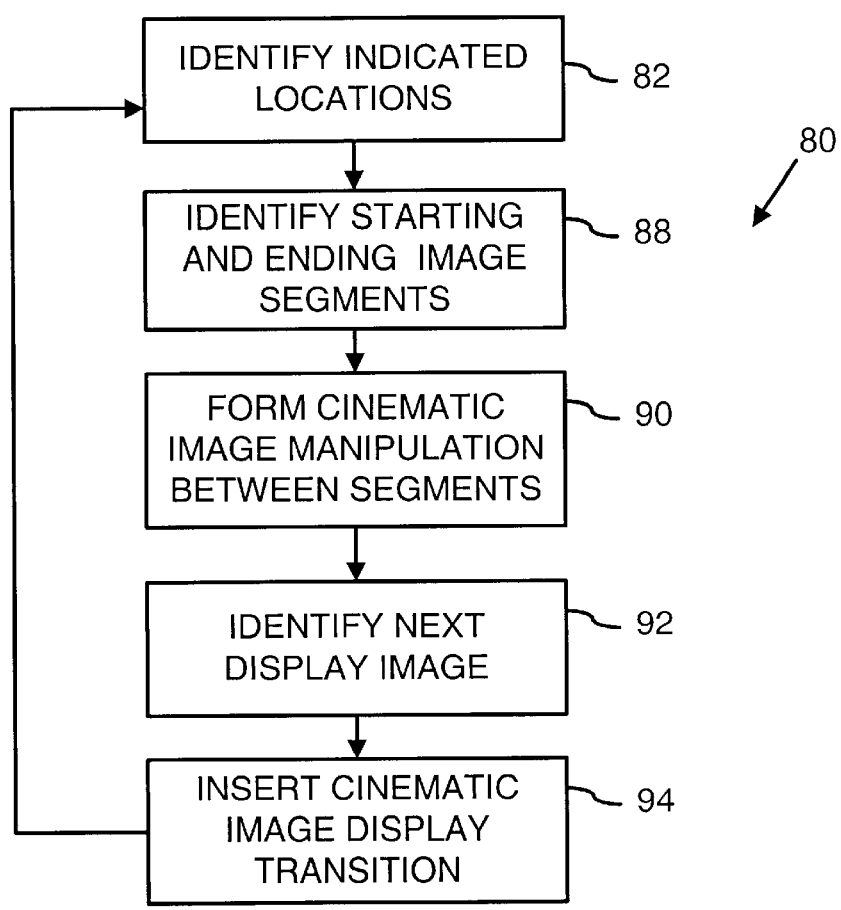
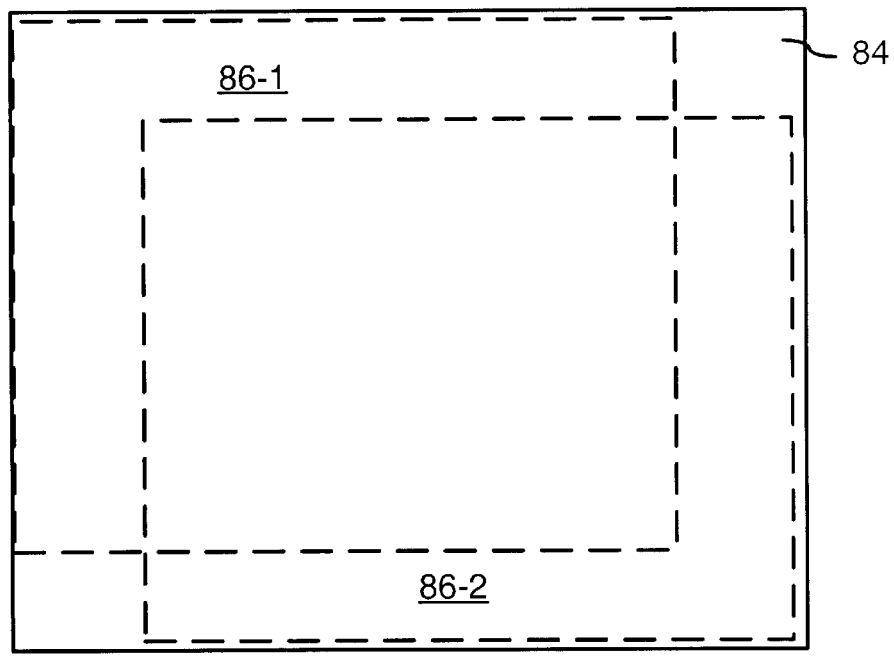

ASSEMBLING VERBAL NARRATION FOR DIGITAL DISPLAY IMAGES

TECHNICAL FIELD

The present invention relates to providing verbal explanations for digital display images and, in particular, to combining verbal narration with digital display images and automatic cinematic manipulations.

BACKGROUND AND SUMMARY

A person shares a display image (e.g., a still photograph) with another person by telling a story (i.e., a verbal narration) about what is shown in the image. With regard to conventional print photographs, the story is often told in-person, typically in a comfortable and convenient environment that encourages a spontaneous telling of the story. The personal presence of the story-teller and the typically spontaneous flow of the story typically increases the interest of the listener.

With the increasingly wide use of digital cameras and other tools for creating digital media, still photographs and other display images can be distributed and shared more widely without the direct personal presence of the story-teller. The problem is that computer-based sharing of such digital images typically results in a posting of static images, perhaps with some brief text captions. In view of the effort of typing and the commonly greater expectation of formality in written text over spoken language, written text captions rarely capture the context, mood and details of a spoken narrative.

Also, in-person explanation of still images typically includes gestures or pointing to relevant or significant portions of the image, thereby highlighting relevant parts of the image and helping the story-teller to recall and tell the story. Static display of still images includes no such highlights or story-telling aids. Passively viewing an image while telling its story often hinders the spontaneity of the story-teller, and the static display of images is less interesting for the viewer.

Accordingly, a goal is to recreate or simulate in a computer system the experience of sharing photographs in-person. The present system provides a computer-based environment analogous to in-person sharing of photographs by utilizing spontaneous verbal narration or story-telling, together with manual indications by the story-teller of significant or relevant image portions. The system combines the verbal narration with automatic cinematic display manipulations that relate to the manual indications by the story-teller to form a multimedia production or "movie" from the display images. The cinematic display manipulations may include pans, zooms, fades, etc. that animate the display of the images and transitions between them.

In one implementation, a narration assembly method for assembling narration with digital display media components provides simplified production of a narrated sequence or "video" of multiple separate digital display media components. The digital display media components or images may be, for example, still digital graphics or photographs, as well as video segments, computer display screen images or pages (e.g., Web pages, office application pages, such as slides from PowerPoint® software from Microsoft Corporation or pages from word processing software, etc.).

The narration assembly method includes selecting a digital display image within set of images and recording in a computer system a verbal narration by the user (i.e., story-teller) relating to the image. The user is prompted to indicate or point to relevant portions of the image, such as with a computer input device like a mouse, while telling the story. The locations or regions that are indicated or pointed to during the narration are also recorded in the computer system.

A digital multimedia production is formed in accordance with the narration and the display image locations or regions indicated by the user. The digital multimedia production may be in the form of, or include, a video, slide show, web tour, or any other series of images arranged in time, synchronized with audio or textual commentary. The multimedia production is formed in connection with cinematic image manipulations and predefined cinematic rules that are applied automatically without user input. The cinematic image manipulations provide a dynamic image display that relates to the story-teller's manual indications and improve the viewing of the images. The predefined cinematic rules ensure that the resulting multimedia production conforms to conventional cinematic practices, thereby avoiding the distraction of unconventional image manipulations that can distract from the verbal narration.

The present system facilitates the spontaneous telling of stories for display images and results in a production analogous to a professional documentary film based upon narrated still images. As in a documentary film, the present system can provide panning and zooming over the images in an aesthetically pleasing manner. In providing the cinematic image manipulations automatically, the story-telling spontaneity is preserved and the user is spared the technical difficulty of producing a cinematically-pleasing sequence.

Additional objects and advantages of the present invention will be apparent from the detailed description of the preferred embodiment thereof, which proceeds with reference to the accompanying drawings.

BRIEF DESCRIPTION OF THE DRAWINGS

FIG. 2 is a flow diagram of a narration assembly method for assembling narration with digital display media components.

FIG. 3 is a flow diagram of one implementation of a cinematic imaging method that automatically utilizes display image locations or regions that are indicated by the user.

FIG. 4 illustrates an image region and sub-regions corresponding to an exemplary digital display image to which the assembly method of FIG. 2 is applied.

DETAILED DESCRIPTION OF PREFERRED EMBODIMENT

Figure 1:
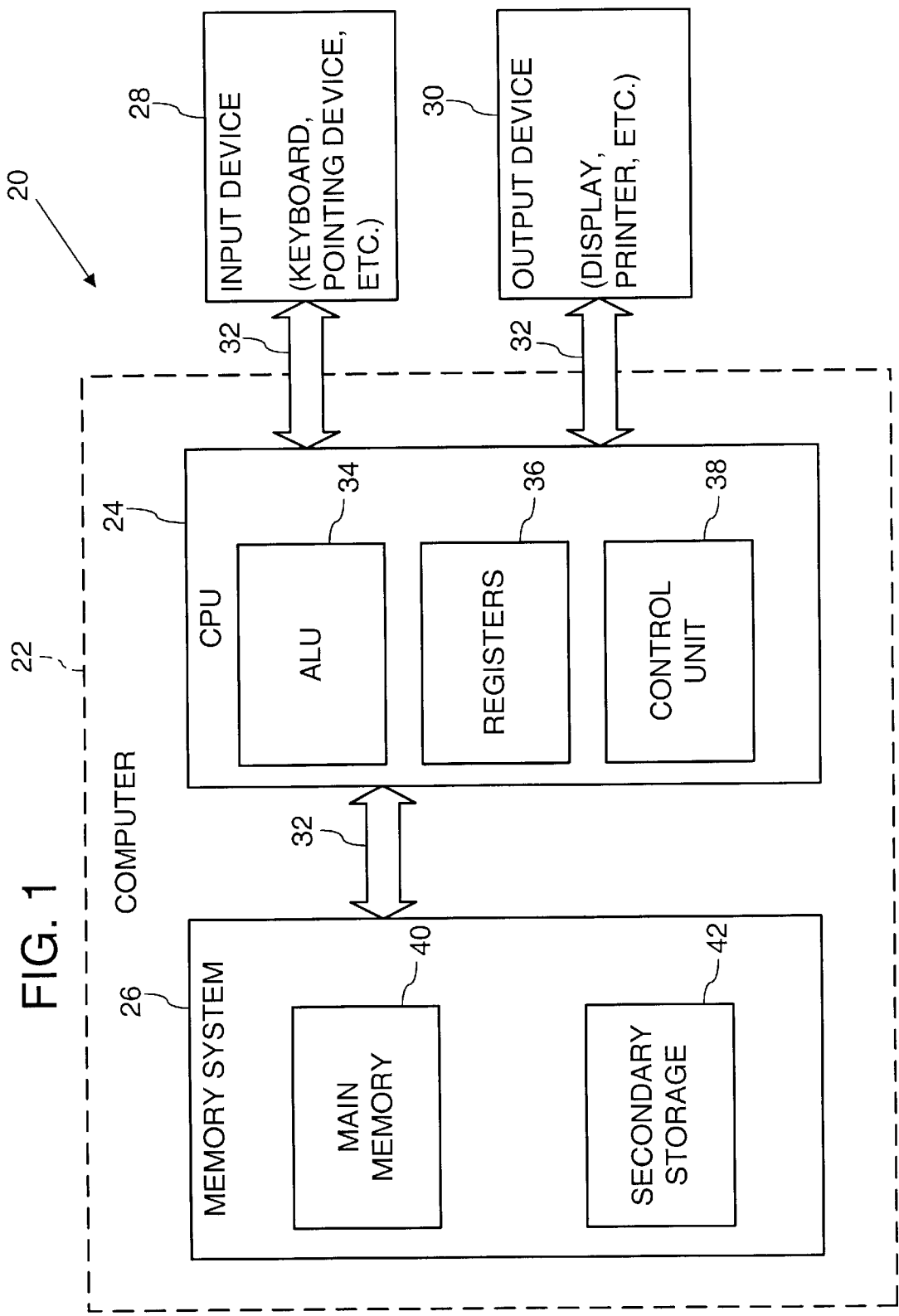
FIG. 1 illustrates an operating environment for an embodiment of the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x 86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software that controls the computer system operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

FIG. 2 is a flow diagram of a narration assembly method 50 for assembling narration with digital display media components. Assembly method 50 provides simplified production of a narrated sequence or "video" of multiple separate digital display media components. The digital display media components or images may be, for example, still digital graphics or photographs, as well as video segments, computer display screen images or pages (e.g., Web pages, office application pages, such as slides from PowerPoint® software from Microsoft Corporation or pages from word processing software, etc.). For purposes of convenience, assembly method 50 will be described with reference to digital display images such as still digital photographs, but is similarly applicable to other types of digital display images.

Process block 52 indicates that a set of multiple digital display images is identified.

Process block 54 indicates that a digital display image within the set is selected. For example, the digital display image may be selected automatically according to a sequence in which the multiple digital display images are listed or the digital display image may be selected from the set by a user.

Process block 56 indicates that the selected digital display image is displayed or rendered for the user.

Process block 58 indicates that the user is prompted to verbally narrate (e.g., explain, describe, etc.) the selected digital display image while optionally indicating or pointing to corresponding features in the digital display image. The narration is to be directed into a microphone input device 28 of computer system 20, and the pointing to the digital display image is to be done with a computer input pointing device such as a mouse or a similar device.

Process block 60 indicates that computer system 20 stores the verbal narration in association with an indication of the selected digital display image.

Process block 62 indicates that computer system 20 stores the locations or regions, if any, that are indicated or pointed to in association with the indication of the selected digital display image.

Query block 64 represents an inquiry as to whether there is another digital display image in the set. Whenever there is another digital display image in the set, query block 64 proceeds to process block 66. Whenever there is not another digital display image in the set, query block 64 proceeds to process block 68.

Process block 66 indicates that a next digital display image within the set is selected. For example, the digital display image may be selected automatically according to a sequence in which the multiple digital display images are listed or the digital display image may be selected from the set by a user. Process block 66 returns to process block 56.

Process block 68 indicates that a digital multimedia production is formed in accordance with the narration and the display image locations or regions indicated by the user. The digital multimedia production may be in the form of, or include, a video, slide show, web tour, or any other series of images arranged in time, synchronized with audio or textual commentary.

FIG. 3 is a flow diagram of one implementation of a cinematic imaging method 80 that automatically utilizes display image locations or regions that are indicated by the user to form cinematic display manipulations in the digital multimedia production step of process block 68.

Process block 82 indicates that the locations or regions that are indicated or pointed to in connection with the step of process block 62 for a display image are identified with respect to predefined regions in a display image. FIG. 4, which illustrates an image region 84 corresponding to an exemplary digital display image to which assembly method 50 is applied. In the implementation shown in FIG. 4, a 3×3 array of overlapping image sub-regions are defined with respect to image region 84, but only an upper left image sub-region 86-1 and a lower right image sub-region 86-2 are shown for purposes of clarity.

In this implementation, each of the image segments exemplified by image sub-regions 86-1 and 86-2 encompasses about ¾ of the area of image region 84 and is of a rectangular shape with about the same aspect ratio as image region 84. The exemplary size of the image segments reflects an observation that non-professional photographs are commonly over-inclusive of (i.e., over-crop) photographed subject matter, and the ¾ size is a generalized approximation of the relevant portion in a non-professional photograph. It will be appreciated, however, that the image segments could have different shapes, different sizes, etc.

For example, each of the image segments includes a center (not shown) at about the center of the segment. Locations or regions that are indicated or pointed in connection with the step of process block 62 are correlated with the corresponding segment having its center nearest to the indicated location.

Process block 88 indicates that a starting image segment and an ending image segment are identified from the locations or regions that are indicated or pointed in connection with the step of process block 62. The starting image segment is the one of image segments that is indicated or pointed to at the start of the verbal narration for a display image. The ending image segment is the one of image segments that is indicated or pointed to at the end of the verbal narration for a display image (i.e., the narration period).

In one implementation, the amount of time during which each image segment is pointed to during a narration period is determined. The image segment that is pointed to for the most time in the first half of the narration period is identified (i.e., the starting image segment), and the image segment that is pointed to for the most time in the second half of the narration period is identified (i.e., the ending image segment). Alternatively, pointing analysis could use gesture recognition routines or photographic analysis routines to determine if specific objects or areas in the photo are being pointed at.

Process block 90 indicates that a cinematic display manipulation is formed between the starting image segment and the ending image segment for the display image. The cinematic display manipulation may include one or more of a pan, a zoom, etc., based upon the starting and ending image segments indicated by the user.

As an example, the cinematic display manipulation may include a pan from the starting image segment to the ending image segment, or such a pan with a zoom into the ending image segment. In one implementation, the cinematic display manipulation includes a simultaneous pan (from the starting image segment to the ending image segment) and zoom. The duration of the pan, or pan and zoom, may be the same as the duration of the narration for the display image. Alternatively, the pan, or pan and zoom, may be preceded or followed by a brief still rendering of the starting image segment or the ending image, or both.

In one implementation, the one of the starting and ending image segments that is pointed to for the most time is designated the candidate image segment. If the starting image segment is the candidate image segment, the cinematic display manipulation may include a pan or zoom from the starting image segment to the whole display image. If the ending image segment is the candidate image segment, the cinematic display manipulation may include a pan or zoom from the whole display image to the ending image segment.

The cinematic display manipulation step of process block 90 utilizes the user indications of image segments subject to conventional cinematic rules. Such rules are well-known and nearly universally adopted in cinematic production and guide the manner in which most professional motion pictures, television programs, and videos are produced.

Examples of such rules include:
Start by zooming in
End by zooming out
Do not alter both pan and zoom between images (i.e., only one transition per display image)
Do not reverse pan direction
Do not repeat It will be appreciated that any combination or all of these rules, or other cinematic rules, may be used as the conventional cinematic rules to be applied in the cinematic display manipulation step.

Table 1 below lists exemplary user indications of image segments for six display images, as determined above, and the resulting cinematic display manipulations that conform to the predefined cinematic rules. In Table 1, ZI means zoom in, ZO means zoom out, PL means pan left, PR means pan right.

TABLE 1

| Image # | User Input | Image result | Rule |
|---|---|---|---|
| 1 | ZI-PL | ZI | Zoom in start |
| 2 | ZI-PL | ZI-PL | OK - only 1 change |
| 3 | ZO-PL | ZO-PL | OK - only 1 change |
| 4 | ZO-PR | PL | No reverse pan, already zoomed out |
| 5 | ZI-PR | ZI | No reverse pan |
| 6 | ZI-PL | ZO | Zoom out end |

Table 1 illustrates the combination of user indications of image segments subject with conventional cinematic rules to provide the cinematic display manipulation step of process block 90.

In addition to cinematic display manipulations within display images, overall cinematic transitions may be inserted for the beginning and end of the overall digital multimedia production. For example, a fade-in to a full view of the first display image may be used to start the production, and a fade out may be inserted after the final zoom out of the last display image of the production.

Process block 92 indicates that a next display image is identified.

Process block 94 indicates that a cinematic display image transition is inserted between the current display image and the next display image. For example, a smooth cross-fade or sweep (e.g., left-to-right) may provide a transition from the current display image to the next display image. Process block 94 returns to process block 82 for application of cinematic imaging method 80 to the next display image.

Figure 5:
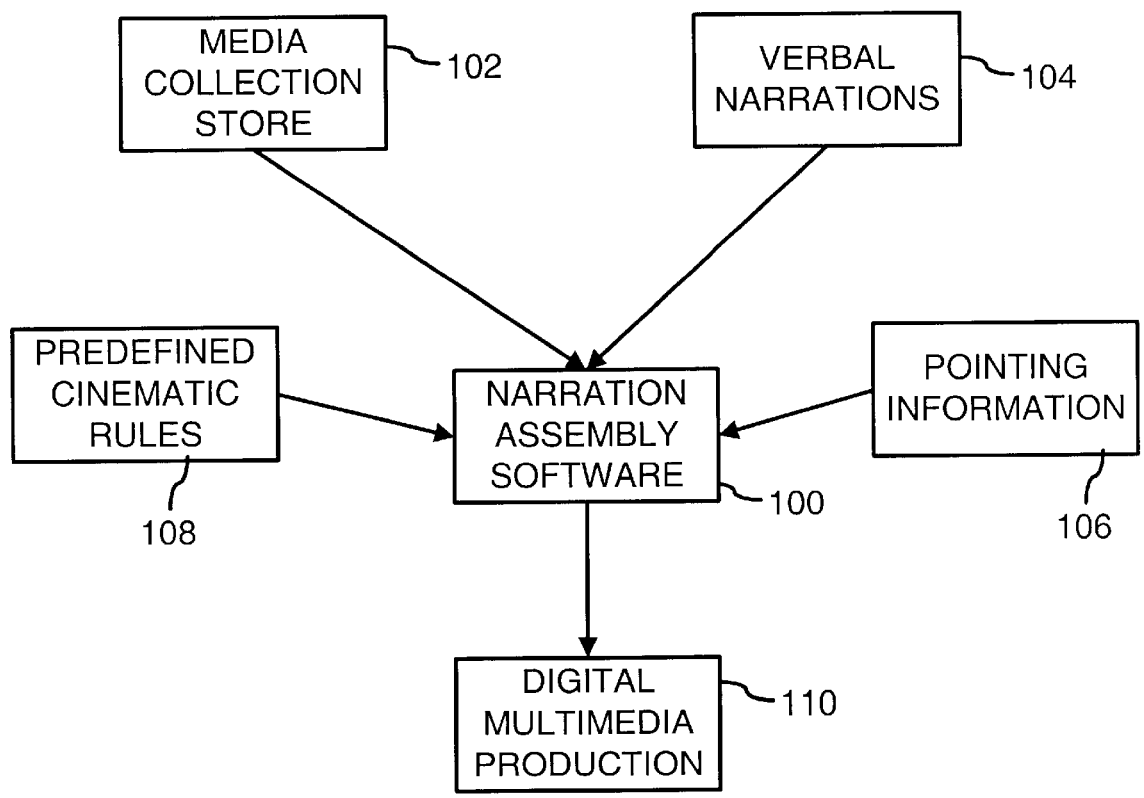
FIG. 5 is a system block diagram illustrating operation of narration assembly software for assembling narration with digital display media components.

FIG. 5 is a system block diagram illustrating operation of narration assembly software 100 for assembling narration with digital display media components. Narration assembly software 100 accesses and utilizes a media collection store 102 that includes multiple digital display images, such as digital still photographs, digital video segments, computer network or Web pages, pages or slides from a display application such as PowerPoint® from Microsoft Corporation, etc. In some implementations, such as digital video segments, the digital display images may also have audio components associated with them.

During operation, narration assembly software 100 obtains and stores one or more verbal narrations 104 for the digital display images retrieved from media collection store 102. Simultaneously, narration assembly software 100 obtains and stores biometric pointing information 106 relating to locations or regions in the digital display images pointed to or otherwise indicted by the user while narrating. Narration assembly software 100 integrates the digital display images from media collection store 102 with the verbal narrations 104, and a combination of the biometric pointing information 106 and predefined cinematic rules 108, to form a digital multimedia production 110.

Digital multimedia production 110 may be formed in any file format, such as a conventional video file format. Examples of such a video file format include the AVI file format and the Windows® movie file format. An example of a file format that is not a conventional video file format includes an XML file format in which each display image or media component is displayed for a given time and a cross-fade is generated between successive display images or media components.

Having described and illustrated the principles of our invention with reference to an illustrated embodiment, it will be recognized that the illustrated embodiment can be modified in arrangement and detail without departing from such principles. In view of the many possible embodiments to which the principles of our invention may be applied, it should be recognized that the detailed embodiments are illustrative only and should not be taken as limiting the scope of our invention. Rather, I claim as my invention all such embodiments as may come within the scope and spirit of the following claims and equivalents thereto.

What is claimed is:

1. A narration assembly method for assembling in a computer system narration with plural digital display media components, comprising:

successively selecting each of plural digital display images in a set;

recording a verbal narration for each of the selected digital display images;

recording one or more manual user indications of one or more locations in each of the selected digital display images simultaneously with the recording of the verbal narration; and forming a digital multimedia production that incorporates the digital display images and the verbal narrations, together with cinematic display manipulations that automatically vary the rendering of the digital display images in relation to the manual user indications.

2. The method of claim 1 further comprising automatically applying plural predefined cinematic rules to forming the digital multimedia production.

3. The method of claim 2 in which the rendering of the digital display images in relation to the manual user indications is subject to the automatic application of the predefined cinematic rules.

4. The method of claim 2 in which the automatic application of the plural predefined cinematic rules over-rules contrary manual user indications in the rendering of the digital display images.

5. The method of claim 1 in which the manual user indications of one or more locations in each of the selected digital display images relate to plural predefined regions in each selected digital display image.

6. The method of claim 5 in which the plural predefined regions overlap each other and provide approximation of a location indicated by the user.

7. The method of claim 5 further comprising identifying a candidate location from the manual user indications in each of the selected digital display images, the candidate location being the one of the predefined regions to which the manual user indications are directed most during an initial half of the verbal narration, the cinematic display manipulations being made in relation to the candidate location.

8. The method of claim 5 further comprising identifying a candidate location from the manual user indications in each of the selected digital display images, the candidate location being the one of the predefined regions to which the manual user indications are directed most during a latter half of the verbal narration, the cinematic display manipulations being made in relation to the candidate location.

9. The method of claim 1 in which the cinematic display manipulations include image panning and zooming.

10. The method of claim 1 in which the digital display images include digital still photographs.

11. The method of claim 1 in which the digital display images do not include digital still photographs.

12. The method of claim 1 in which at least one of the digital display images includes an audio component.

13. In a computer readable medium, narration assembly software for assembling narration with plural digital display media components, comprising:

software for recording a verbal narration for each of plural successively selected digital display images in a set;

software for recording one or more manual user indications of one or more locations in each of the selected digital display images simultaneously with the recording of the verbal narration; and software for forming a digital multimedia production that incorporates the digital display images and the verbal narrations, together with cinematic display manipulations that automatically vary the rendering of the digital display images in relation to the manual user indications.

14. The medium of claim 13 further comprising software for automatically applying plural predefined cinematic rules to forming the digital multimedia production.

15. The medium of claim 14 in which the rendering of the digital display images in relation to the manual user indications is subject to the automatic application of the plural predefined cinematic rules.

16. The medium of claim 14 in which the automatic application of the plural predefined cinematic rules over-rules contrary manual user indications in the rendering of the digital display images.

17. The medium of claim 13 in which the manual user indications of one or more locations in each of the selected digital display images relate to plural predefined regions in each selected digital display image.

18. The medium of claim 17 further comprising software for identifying a candidate location from the manual user indications in each of the selected digital display images, the candidate location being the one of the predefined regions to which the manual user indications are directed most during an initial half of the verbal narration, the cinematic display manipulations being made in relation to the candidate location.

19. The medium of claim 17 further comprising software for identifying a candidate location from the manual user indications in each of the selected digital display images, the candidate location being the one of the predefined regions to which the manual user indications are directed most during a latter half of the verbal narration, the cinematic display manipulations being made in relation to the candidate location.

20. The medium of claim 13 in which the cinematic display manipulations include image panning and zooming.

21. The medium of claim 13 in which the digital display images include digital still photographs.

22. The medium of claim 13 in which the digital display images do not include digital still photographs.

23. In a computer readable medium, narration assembly software for assembling narration with plural digital display media components, comprising:

software for recording simultaneously a verbal narration and a manual user indication of a location in each of selected digital display images simultaneously with the recording of the verbal narration; and software for forming a digital multimedia production that incorporates the digital display images and the verbal narrations, together with cinematic display manipulations that automatically vary the rendering of the digital display images in relation to the manual user indications.

24. The medium of claim 23 further comprising automatically applying plural predefined cinematic rules to forming the digital multimedia production.

25. The medium of claim 23 in which the rendering of the digital display images in relation to the manual user indications is subject to the automatic application of the plural predefined cinematic rules.

26. In a computer readable medium, narration assembly data structure for assembling narration with plural digital display media components, comprising:

a set of plural digital display images;

a verbal narration recorded for each of the digital display images;

manual user indications of one or more locations in each of the selected digital display images recorded simultaneously with the verbal narration; and plural predefined cinematic rules to be automatically applied in the rendering of the digital display images.

27. The data structure of claim 26 in which the digital display images include digital still photographs.

28. In a computer readable medium, narration assembly software for assembling narration with plural digital display media components, comprising:

software for recording a verbal narration for plural successively selected digital display images;

software for recording one or more manual user indications of one or more locations in one or more of the selected digital display images simultaneously with the recording of the verbal narration; and software for forming a digital multimedia production that incorporates the digital display images and the verbal narrations, together with cinematic display manipulations that automatically vary the rendering of the digital display images in relation to the manual user indications.

29. In a computer readable medium, narration assembly data structure for assembling narration with plural digital display media components, comprising:

a verbal narration recorded for each of plural digital display images;

manual user indications of one or more locations in each of the selected digital display images recorded simultaneously with the verbal narration; and plural predefined cinematic rules to be automatically applied in the rendering of the digital display images.

30. A narration assembly method for assembling in a computer system narration with a digital display media component, comprising:

displaying a digital display image;

recording a verbal narration for the digital display image;

recording one or more manual user indications of one or more locations in the digital display image simultaneously with the recording of the verbal narration; and forming a digital multimedia production that incorporates the digital display image and the verbal narration, together with cinematic display manipulations that automatically vary the rendering of the digital display image in relation to the one or more manual user indications.

* * * * *